United States Patent
Rowland-Hill

[15] 3,670,739
[45] June 20, 1972

[54] AXIAL FLOW COMBINE WITH A ROTARY DISCHARGE AND A STRAW CHOPPER

[72] Inventor: Edward William Rowland-Hill, Lancaster, Pa.

[73] Assignee: Sperry Rand Corporation, New Holland, Pa.

[22] Filed: July 14, 1971

[21] Appl. No.: 162,512

[52] U.S. Cl. ........................................130/27 T, 146/117 R
[51] Int. Cl. .........................................................A01f 7/06
[58] Field of Search............130/27 R, 27 E, 27 F, 27 T; 146/107 L, 107 T, 117 R, 117 A, 121

[56] References Cited

UNITED STATES PATENTS

| | | | |
|---|---|---|---|
| 2,950,747 | 8/1960 | Alloway | 146/117 R |
| 2,314,901 | 3/1943 | Scranton | 130/27 E |
| 3,215,145 | 11/1965 | Zmuda | 130/27 E |
| 3,602,230 | 8/1971 | Knapp | 130/27 T |

Primary Examiner—Antonio F. Guida
Attorney—John C. Thompson, et al.

[57] ABSTRACT

An axial flow combine has two axial flow threshing and separating units with a rotary discharge receiving discharged threshed crop material from the rear of the axial units and impelling the threshed crop material through the rear of the combine hood. A straw chopper is mounted at the rear of the hood and has a feed plate extending upwardly and forwardly within the hood for receiving and guiding crop material to the straw chopper. A transverse roll extends along the upper rear edge of the plate to clear the end of threshed crop material.

9 Claims, 6 Drawing Figures

INVENTOR
EDWARD WILLIAM ROWLAND-HILL
BY George C. Bower
ATTORNEY

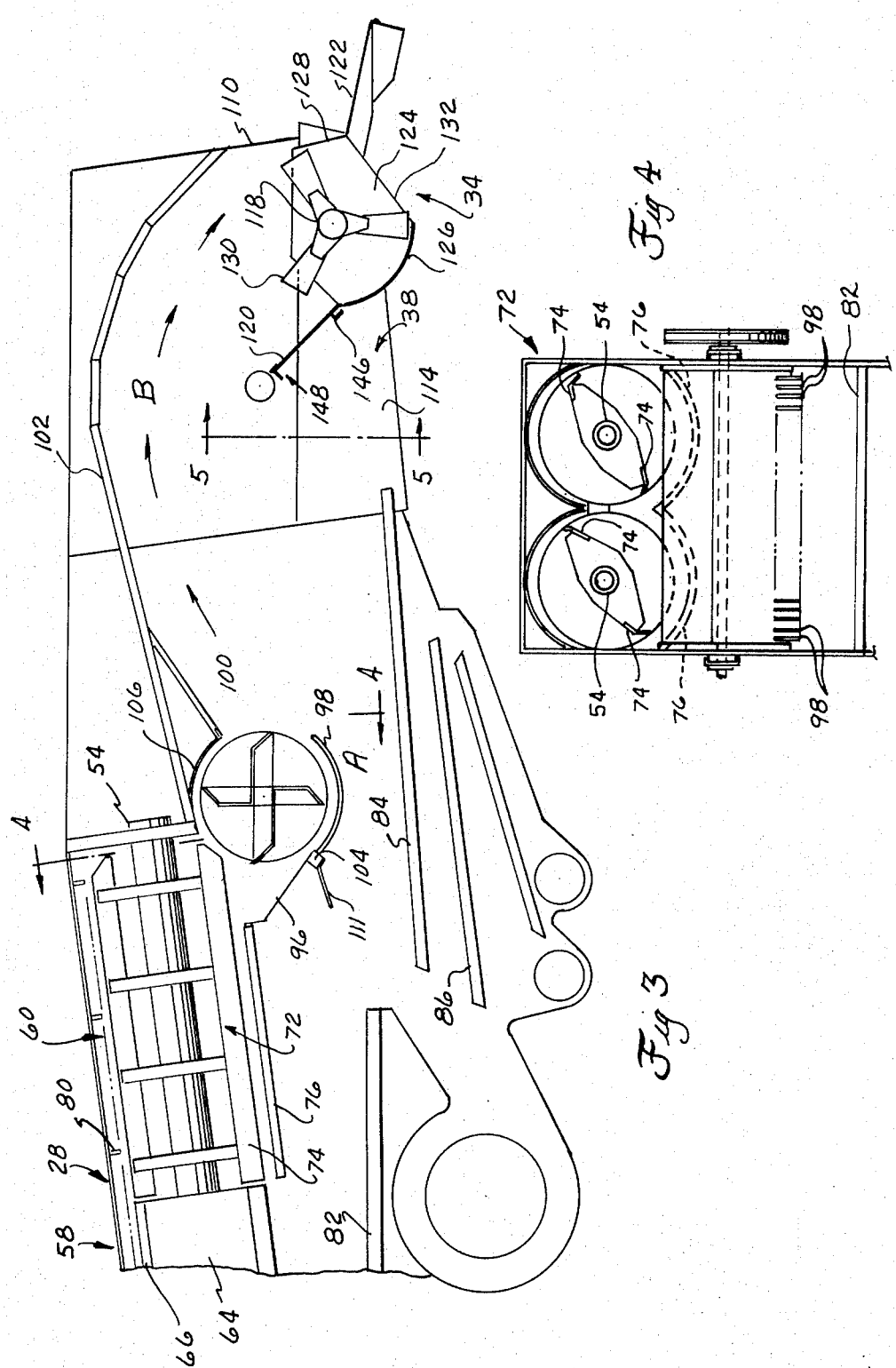

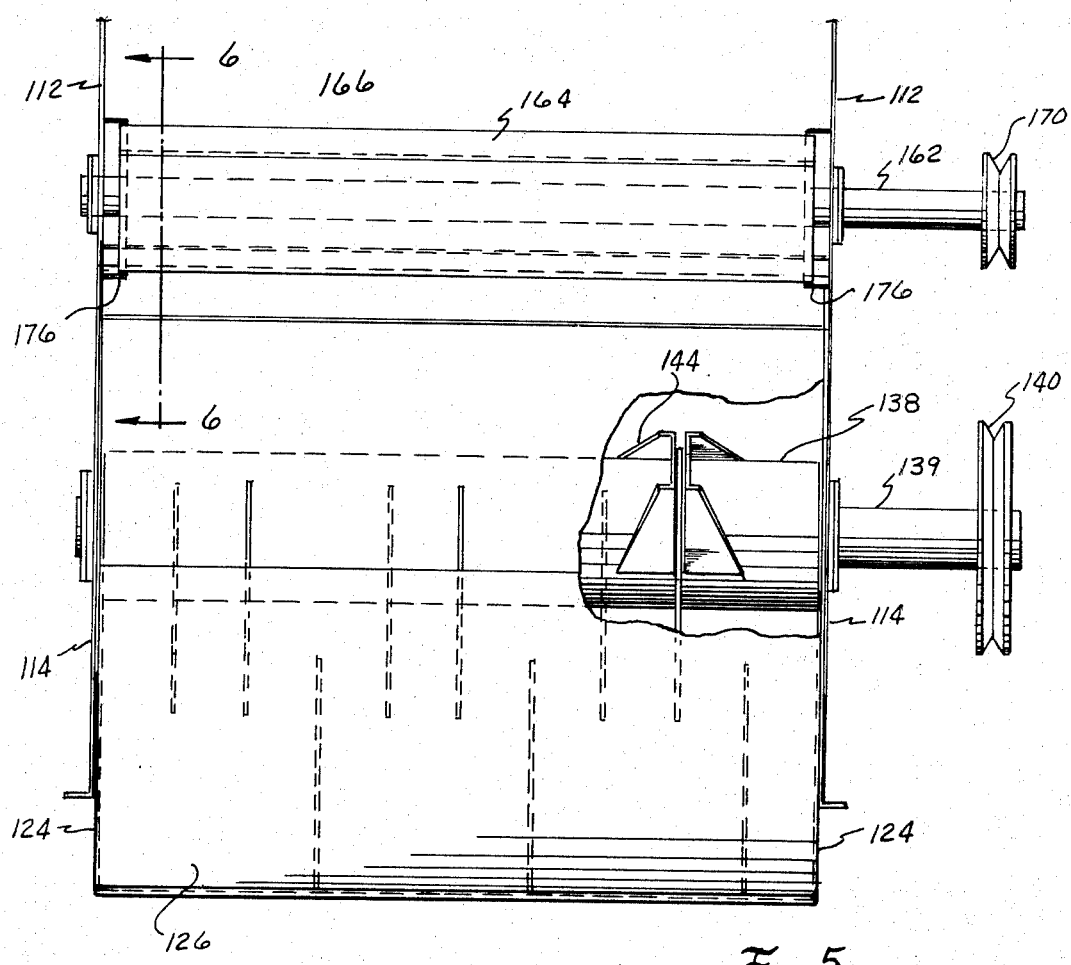
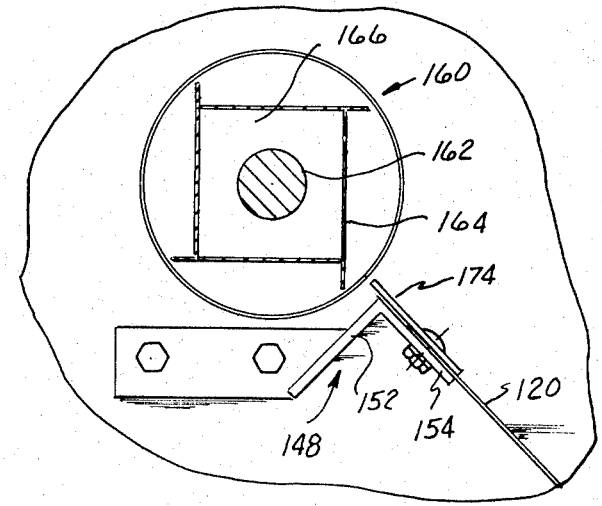

AXIAL FLOW COMBINE WITH A ROTARY DISCHARGE AND A STRAW CHOPPER

RELATED APPLICATIONS

This relates to my co-pending application Ser. No. 51,082, filed on June 30, 1970 and titled "An Axial Flow Threshing and Separating Means with a Load Distributing Threshing Rotor" and to my co-pending patent application Ser. No. 151,682, filed on June 10, 1971 and titled "An Axial Flow Combine with a Rotary Discharge" which is a continuation-in-part of application Ser. No. 51,082.

BACKGROUND OF THE INVENTION

This invention relates to the discharge of threshed crop material from an axial type combine and is directed particularly to the delivery of threshed crop material to a straw chopper at the rear of the combine.

In the aforementioned related applications, a rotary discharge is located at the discharge opening of the separating means of the axial flow units. As explained in the latest application, the discharge of the separating means is intermediately above the grain handling and cleaning means. The ends of the axial units are a substantial distance from the rear of the hood through which the material is to be discharged in manner not to interfere with the cleaning of the grain by the grain handling and cleaning means. The rotary discharge impels the threshed crop material clear of the grain handling and cleaning means and the stream of air carrying the light chaff.

It is customary to chop the threshed discharged crop material and spread it over the ground for better working of the crop material into the soil and for better distribution of the soil enriching nutrients. Conventionally, straw choppers are mounted at the rear of the straw walkers which extend into the rear hood. In the axial flow combines, the straw chopper is also at the rear of the hood and in the path of the material impelled by the rotary discharge. A feed plate extends forwardly and upwardly to guide the arched discharged material dropping short of the straw chopper into the straw chopper. The plate has an upper transverse forward end which accumulates crop material, particularly, if it is long. This material drapes over the end to interfere with the straw chopper and the air stream from the grain cleaning means.

OBJECTS AND SUMMARY OF THE INVENTION

An object of the invention is to provide means for guiding threshed crop material into a straw chopper mounted on the hood of a combine without accumulating crop material.

Another object of this invention is to prevent the accumulation of threshed crop material on the forward end of the feed plate extending upwardly and forwardly from a straw chopper.

In summary, this invention comprises in an axial flow combine the combination of a rotary discharge intermediately above the grain handling and a cleaning means and a straw discharge at the rear of the hood with a feed plate extending upwardly and forwardly in the hood for guiding material into the straw chopper and a straw chopper feed roll along the upper end of the plate for preventing the accumulation of threshed crop material impelled rearwardly by the rotary discharge.

These and other objects and advantages of this invention will be apparent from the following description and claims taken in connection with the accompanying drawings which illustrate the various features of this invention.

BRIEF DESCRIPTION OF THE DRAWINGS

FIG. 3 is an enlarged longitudinal sectional view of the rear part of the combine 3—3 of FIG. 5.

FIG. 4 is a rear view of the rotary discharge and the axial threshing and separating units taken along line 4—4 of FIG. 3.

FIG. 5 is a rear view of the straw chopper taken along line 5—5 of FIG. 3.

FIG. 6 is a sectional view of the roll taken along line 6—6 of FIG. 5.

DETAILED DESCRIPTION OF PREFERRED EMBODIMENT

Figure 1:
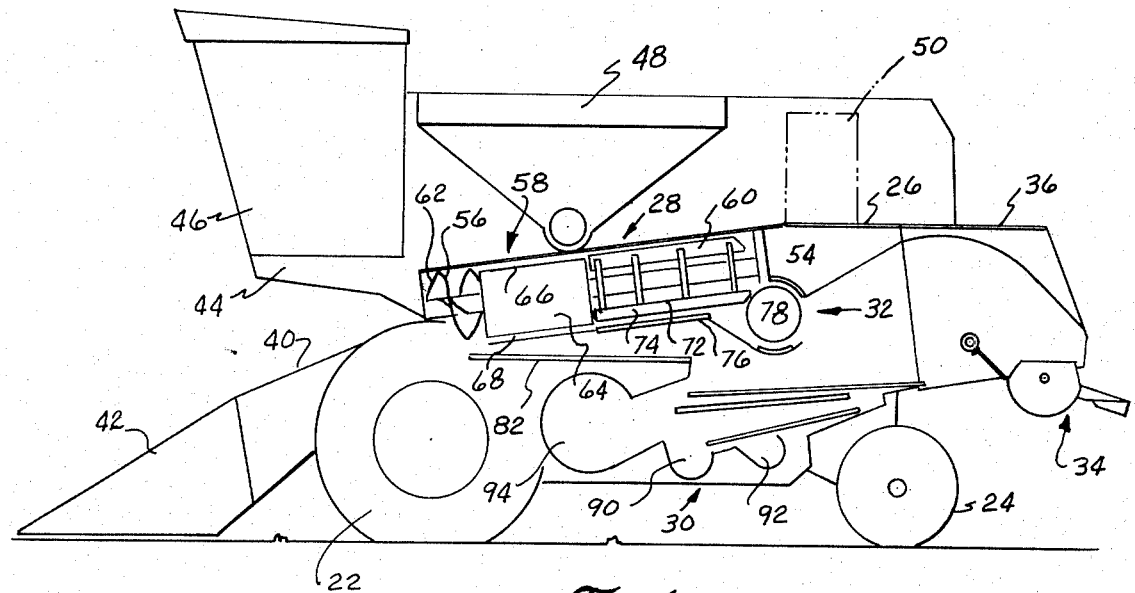
FIG. 1 is a view of the left side of the combine with the side and casing broken away to show the axial threshing and separating units, the grain handling and cleaning means and the rotary discharge assembly.

As previously mentioned, these mobile axial flow types of combines, in which this invention is embodied for the purpose of this description, is disclosed in the aforementioned patent applications. These combines, as conventional combines, harvest the crop by a header or row crop attachment mounted on a crop elevator attached to the combine. The combine described herein has two large drive wheels 22 and two small rear steering wheels 24. A housing 26 on the frame encloses and supports two axial flow threshing and separating units 28, grain handling and cleaning mechanism 30, a rotary discharge 32 and a straw discharge 34. The housing extends rearwardly and has a hood 36 enclosing the back of the housing and providing a large fore-and-aft space with a bottom opening 38 for discharging chaff and straw onto the ground. The straw chopper 32 is mounted on the lower portion of the hood to chop the discharge threshed crop material and deposit it on the ground.

On the front of the combine is the crop elevator 40 and the header 42. The crop elevator is the width of the combine housing 26. The header 42 has a width greater than the distance between the front wheels 22 for harvesting a wide swath of crops in front of the combine. The harvested crops are fed by the header to the crop elevator. Extending forwardly from the housing and over the crop elevator is the operator platform 44 and the cab 46.

On the top of the combine is a grain tank 48 for temporarily storing the threshed grain and a motor 50 for providing power to drive the combine and to operate the header, crop elevator, axial units, rotary discharge, grain handling and cleaning mechanism, straw chopper and other power operated parts.

In this preferred embodiment, the axial threshing and separating means is described as two axial units in side-by-side relation. However, the invention described and shown in this embodiment is also applicable to a single axial threshing unit. The two axial flow threshing and separating units 28 comprise two generally cylindrical casings 52 in side-by-side relation with rotatable shafts 54 extending therethrough. Each axial unit has a feed section 56, threshing section 58, and separating section 60. Each feed section 56 has an auger 62 on the respective shafts 54 for feeding crop material into the following threshing section. The crop material is delivered to the auger by the crop elevator 40. Each threshing section 58 has a rotor 64 and rasp bars 66 for threshing the crop material in cooperation with the concaves 68 in the casing. Each separating section has a separating rotor 72 (FIGS. 1 and 3) with separating blades 74 cooperating with the grates 76 to separate threshed grain from the remainder of the crop material. The rotors 72 extend over the opening 78 for discharging the threshed material downwardly to the rotary discharge 32. Flights 80 (FIG. 3) are mounted on the inside of the upper wall of the casing 52 to spirally rotate the crop material through the axial units for successive threshing and separating actions.

GRAIN HANDLING AND CLEANING MECHANISM

The grain handling and cleaning mechanism is similar to the mechanisms of conventional combines and is best shown in FIGS. 1 and 3. The grain pan 82 extends across the combine underneath the axial units and from the front of the threshing sections to the rear of the separating grates 76. Thus, the grain pan extends over the entire length of the concaves and grates to catch the separated grain. The grain pan oscillates to move the grain to the rear edge over the chaffer sieve 84. The chaffer and grain sieve 84 and 86, respectively, are mounted to oscillate fore-and-aft to move the chaff and other debris to the rear of the chaffer and the tailings to the rear of the grain sieve. In this combine the chaffer sieve 84 extends rearwardly beyond the housing into the forward portion of the hood. The rear of the chaffer sieve projects over the opening 38 for the discharge of the chaff onto the ground. The grain sieve 86 also operates conventionally and passes grain onto the grain chute 88 for delivery to the grain auger 90. The tailings drop off the rear end of the grain sieve to slide down the casing to the tailings auger 92.

An important feature of a grain handling and cleaning mechanism is the air stream from the blower 94 passing between the end of the grain pan and the chaffer sieve to carry rearwardly in the air stream A the light chaff and debris in the grain. The air stream also passes through the chaffer sieve to pick up the light chaff and also to carry it out through the bottom opening 38. This lessens the amount of chaff that has to be handled by the chaffer sieve and the cleaning load on the grain cleaning means. Interference with this air stream may cause the light chaff to drop onto the chaffer sieve. It is, therefore, important to maintain the air stream.

ROTARY DISCHARGE ASSEMBLY

The rotary discharge 32 is at the discharged end of the separating sections of the axial units and over the chaffer sieve. It extends transversely across the combine between the side walls 95 of the housing 26. The assembly comprises a deflecting shield 96, curved member 98, rotor 100 and rearwardly extending guide wall 102. The details of the rotary discharge assembly are more fully described in my co-pending application previously referred to. For the purposes of this invention, a brief description of this assembly will be made. The deflector shield 96 is a solid sheet metal piece extending across the housing to guide the discharge straw downwardly and rearwardly from the rear of the grates 76. The deflector shield is attached to the end of the grates and to the transverse beam 104 which are adjustably fastened to the side walls of the housing. The curved member is attached to the lower edged portion of the deflector shield and extends rearwardly and facing concavely upwardly to generally follow the curved configuration of the rotor 100. The curved member may be a solid plate or a grate means. The grate means may be spaced parallel rods with parallel spaces therebetween or may be members perpendicular to one another to form rectangular openings. In the grate form a final separation and recovery of the grain in the threshed crop material is advantageously obtained. The rotor may be of a beater construction with four outwardly extending blades as shown in FIG. 3. The rotor may be spiked or other form for propelling the crop rearwardly. A cut-off plate 106 is positioned over the top of the rotor to enclose the rotor and create a discharge along the guide wall 102. The rotor is mounted in bearings in the side walls and driven from the motor 50 by suitable drive means, not shown. The rotor in cooperation with the curved member propels the threshed crop material rearwardly along the guide wall 102. The guide wall 102 extends across the width of the housing and hood and rearwardly at a slight upward angle and then curves downwardly to the end wall 110 of the hood. The discharged crop material generally follows this in a curved arch or path as indicated by the arrows B. On the beam 104 is a plate 111 extending rearwardly and downwardly and transversely across the housing to prevent the interference of any flowing air from the axial units with the air stream A from the blower 94.

STRAW CHOPPER

Figure 2:
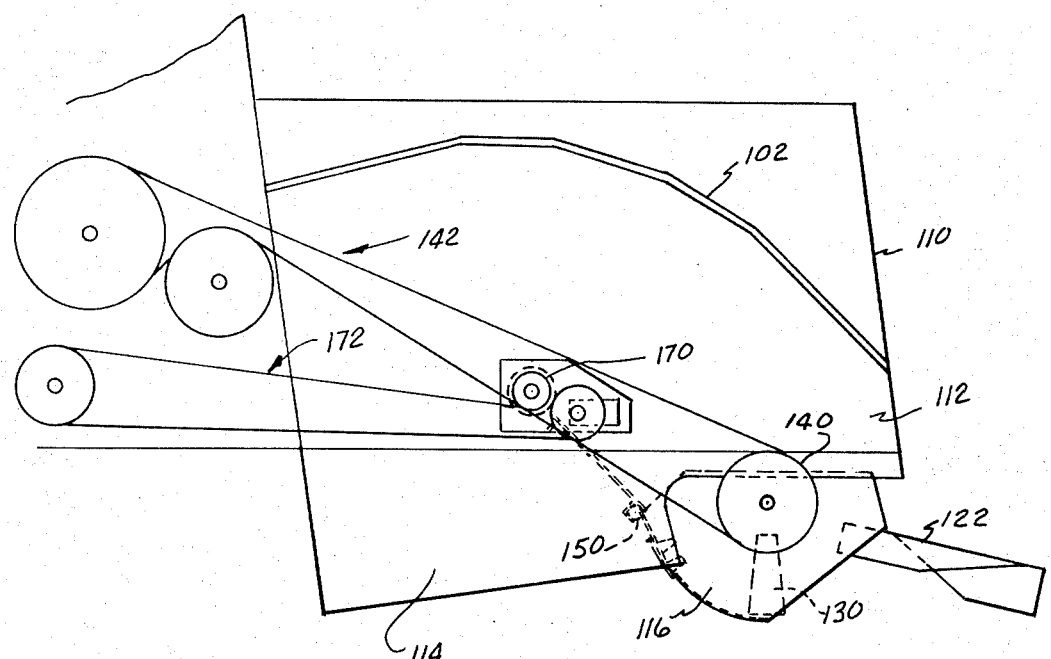
FIG. 2 is an enlarged left side view of the rear portion of the combine including the hood and its straw chopper.

The straw chopper 34 is of a conventional type and is mounted on the side plate extensions 114 of the side walls 112 of the hood (FIG. 5) and comprises in general the casing 116 (FIG. 2), a knife bearing rotor 118, and upwardly and forwardly extending feed plate 120 and a vane bearing member 122 extending rearwardly from the straw chopper discharge. The vane bearing member 122 extends generally horizontal and adjustably supports the vertical and rearward vanes 122a to position the vanes over a range of angles to one another for a narrow or wide discharge of chopped material. The casing 116 comprises two side members 124, a transversely curved member 126 extending between the side members and a rear plate like member 128. The knife bearing rotor 118 is rotatably mounted in bearings on the side members 124, respectively. The side extensions are cut out at the rear to accommodate the straw chopper and bearings. The generally solid curved member 126 is forwardly of the rotor and has an upper forward planar part and a rearward, downwardly curved part conforming generally to the cylindrical periphery of the rotating knives 130 when rotating as in FIG. 3. The curved member has a terminal edge underneath the axis of rotation of the rotor and forms a discharge opening 132 with the rear plate-like member 128 for discharging the chopped material from the combine. An inlet opening extends across the top of the casing between the curved member 126 and the rear plate 128. The casing is positioned at the end of the hood and in the rear part of the hood opening. The crop material impelled by the rotary discharge follows the previously described path B into the straw chopper through the top inlet opening.

The rotor comprises a tubular member 138 formed on a shaft 139 rotatably supported in bearings (not shown) mounted on the side 124. The shaft extends through the left side of the casing and has a sheave 140 for connection to the belt and pulley drive 142. The belt and pulley drive is connected by drives, not shown, to the motor 50. Circumferentially and axially position on the tubular member are fixed knife supports 144. The knives 130 are pivotally attached to these supports for extending generally radially outwardly on rotation to chop the crop material in cooperation with the curved member 126.

The feed plate 120 preferably solid extends upwardly and forwardly at an angle for guiding feed into the straw chopper. The feed plate 120 is planar and extends transversely across the hood. Crop material that falls short of the rotor 118 or is thrown by the rotating knives 130 against the feed plate slides downwardly into the rotor. L-shaped angles 146, 148 extend across the hood and are fixedly attached to the side plate extensions 114 and the sides 112, respectively. The lower angle 146 fits around the bead 150 (FIGS. 2 and 3) of the casing and supports the feed plate 120 along the edge of one side. The upper angle 148 is just above the side plate extensions and is welded to strips 150 which are bolted to the side walls 112 of the hood. The side 152, FIG. 6, of the angle faces upwardly and forwardly at an angle and the other side 154 faces upwardly and rearwardly to engage and support the feed plate 120.

The straw chopper feed roll is positioned along the upper end of the feed plate 120. As best seen in FIG. 6, the roll generally comprises a shaft 162, four longitudinally extending plates 164 and blocks 166 longitudinally arranged along the shaft for supporting the plates thereon. The plates are welded to the blocks and to one another along their respective edges. The longitudinally extending edge of each of the plates extends at a right angle to the next succeeding plate to provide a short blade or paddle. The shaft 162 is rotatably mounted in flangette bearings fastened to the side 112 of the hood. A sheave 170 (FIG. 5) is fastened to an extension of the shaft 126 which is part of the belt and pulley drive 172 connected by suitable drives to the motor 50. The straw chopper feed roll is turned in a downward and rearward direction as indicated by the arrow C in FIG. 6. A scrapper 174 is adjustably attached to the upper end of the feed plate 120 to provide a close spacing between the end of the feed plate and the roll. Angular rims 176 are mounted on the inside of the side walls 112 and extend inwardly to overlap the ends of the blades 164 to prevent wrapping of crop material around the shaft 162. The roll is continuously rotated with the operation of the straw chopper and positioned between the end of the feed plate 120 and the direction of the crop material so that crop material that would normally engage or fall across the end of the feed plate is impelled over to the top of the feed plate for feeding into the straw chopper. Thus, the roll assists in the feeding of the crop material. The roll also acts as a wiper to clean the end of the plate of crop material. Thus, crop material cannot accumulate or drape over the end of the feed plate and the discharge of crop material is kept clear of clogging an accumulation of crop material.

SUMMARY OF FEATURES AND ADVANTAGES OF THE INVENTION

It is thus seen that the invention described herein provides a clog free entrance to the straw chopper and the final discharge of the crop material from the combine. The straw chopper cooperates with the rotary discharge assembly to remove the threshed crop material from the combine, chop the crop material and spread it over the ground in a chopped condition. This transfer of material from a rotary discharge to the straw chopper without the accumulation of crop material provides for a continuous and uninterrupted harvesting and threshing of the crop.

This advantage is attained without altering the structure of the conventional straw chopper avoiding the necessity of the redesign of the straw chopper to meet this troublesome condition. The roll is inexpensive to manufacture and is conveniently installed in the combine hood. Also the belt and pulley drive may be conveniently provided to drive the roll.

While the invention has been described, it will be understood that it is capable of further modification and this application is intended to cover any variations, uses or adaptions of the invention following in general, the principles of the invention and including such departures from the present disclosure as come within known or customary practice of the art to which the invention pertains, and as may be applied to the essential features hereinbefore set forth and as are within the scope of the invention for the limits of the appended claims.

Having thus described my invention what I claim is:

1. An axial flow type combine comprising axial flow threshing and separating means for threshing crop material, separating means for separating grain from the remainder of the material, a grain pan underneath said means for collecting grain and moving the grain rearwardly, the grain cleaning means underneath and extending rearwardly of said grain pan to clean the grain and discharge the chaff at the rear of the combine from said cleaning means and in an airborne stream, said separating means having opening means at the rear thereof for discharging threshed crop material, discharge assembly extending transversely to said separating means and downwardly and rearwardly from said opening means for receiving crop material discharged from said opening means, said assembly having a deflector shield sloping downwardly and rearwardly separating means underneath said opening means for receiving the discharged crop material, upwardly facing concave means extending substantially horizontal and rearwardly from said deflector shield, a transverse means rotatably mounted above said concave means to turn downwardly and rearwardly across said concave means to move the crop material across said concave means for propelling the threshed crop material upwardly and rearwardly clear of the cleaning action of the grain cleaning means, a straw chopper mounted at the rear of the combine to receive and chop the propelled threshed crop material and discharge it from the combine, a feed plate extending upwardly and forwardly from the straw chopper for guiding crop material into said straw chopper and having a transversely extending upper forward end, a rotatable transverse roll extending along said end to maintain said end clear of accumulating crop material.

2. An axial flow type combine as set forth in claim 1 wherein the axis of said roll is in the plane of said plate.

3. An axial flow type combine as set forth in claim 1 wherein said feed plate has a transversely extending member adjustably mounted thereon and positionable adjacent to the periphery subscribed by said rotating roll.

4. An axial flow type of combine as set forth in claim 1 wherein means are provided for driving said roll and for turning said roll downwardly and rearwardly.

5. An axial flow type of combine as set forth in claim 1 wherein a housing with a rearwardly extending hood is provided and said hood has spaced side walls between which said feed plate is positioned, said roll comprising a shaft rotatably mounted on said side walls, and plate-like members extending longitudinally along said shaft and fixedly attached thereto and each having an outer edge subscribing a periphery moving past said end.

6. An axial flow type of combine as set forth in claim 5 wherein said plate-like members each have a longitudinal edge portion at an angle thereto and said edges being on said respective edge portions.

7. An axial flow type of combine as set forth in claim 5 wherein said side walls have annular rims extending inwardly to overlap with said plate-like members.

8. An axial flow type of combine as set forth in claim 7 wherein said annular rims are concentric with said shaft and the periphery subscribed by said edges.

9. An axial flow type of combine as set forth in claim 7 wherein said edges are parallel to said shaft and subscribe a cylindrical periphery.

* * * * *